United States Patent
Isaacson

(10) Patent No.: US 6,742,846 B1
(45) Date of Patent: Jun. 1, 2004

(54) MODIFIED HEAD RESTRAINT ASSEMBLY FOR MOTOR VEHICLE SEATS

(76) Inventor: Troy Allen Isaacson, 1294 Briarwood Ct., Wixom, MI (US) 48393

( * ) Notice: Subject to any disclaimer, the term of this patent is extended or adjusted under 35 U.S.C. 154(b) by 0 days.

(21) Appl. No.: 10/386,591

(22) Filed: Mar. 12, 2003

(51) Int. Cl.$^7$ ................................................. A47C 7/36
(52) U.S. Cl. ......................................................... 297/410
(58) Field of Search ................................. 297/410, 391

(56) References Cited

U.S. PATENT DOCUMENTS

| | | | |
|---|---|---|---|
| 3,062,157 A | | 11/1962 | Woods |
| 3,563,603 A | | 2/1971 | D'Aprile et al. |
| 3,635,527 A | | 1/1972 | Weber |
| 4,489,979 A | | 12/1984 | Zyngier |
| 4,577,904 A | | 3/1986 | Wiese et al. |
| 4,604,777 A | * | 8/1986 | Meeks |
| 4,639,041 A | | 1/1987 | Furukawa |
| 4,650,250 A | | 3/1987 | Krügener et al. |
| 4,657,297 A | | 4/1987 | Ishibashi |
| 4,854,642 A | | 8/1989 | Vidwans et al. |
| 4,976,493 A | | 12/1990 | Frankila |
| 5,156,440 A | | 10/1992 | Vidwans |
| 5,529,379 A | * | 6/1996 | Stocker |
| 5,590,929 A | | 1/1997 | Hamelin |
| 5,642,918 A | | 7/1997 | Sakamoto et al. |
| 5,667,276 A | * | 9/1997 | Connelly et al. |
| 5,788,250 A | * | 8/1998 | Masters et al. |
| 5,806,933 A | | 9/1998 | Tsui et al. |
| 5,823,623 A | * | 10/1998 | Beck |
| 5,860,703 A | * | 1/1999 | Courtois et al. |
| 5,945,952 A | | 8/1999 | Davidson |
| 6,056,364 A | * | 5/2000 | De Filippo |
| 6,062,645 A | * | 5/2000 | Russell |
| 6,099,077 A | | 8/2000 | Isaacson |
| 6,454,356 B1 | | 9/2002 | Yamada |
| 2001/0013718 A1 | | 8/2001 | Beck |

FOREIGN PATENT DOCUMENTS

| | | |
|---|---|---|
| AU | 167192 | 4/1954 |
| DE | 24 26 728 | 12/1975 |
| DE | 22 00 282 | 2/1979 |
| FR | 2458-422 | 2/1981 |
| GB | 2 064 312 A | 6/1981 |
| GB | 2 069 584 A | 8/1981 |
| JP | 6-262968 | 9/1994 |
| SU | 1133-135 A | 1/1985 |

* cited by examiner

*Primary Examiner*—Milton Nelson, Jr.
(74) *Attorney, Agent, or Firm*—Brooks Kushman P.C.

(57) ABSTRACT

An adjustable head restraint assembly for enabling a head restraint pad (18) to be adjustably and lockably positioned with respect to a motor vehicle seatback (14) so that the head restraint remains in an adjusted position during a crash sequence after being set by a user. Associated with the head restraint pad is a pair of posts (20) that are provided with notches (52) for adjustment and one or more square securement notches (94) to prevent unintended separation of the head restraint pad (18) from the seatback (14).

7 Claims, 3 Drawing Sheets

MODIFIED HEAD RESTRAINT ASSEMBLY FOR MOTOR VEHICLE SEATS

BACKGROUND OF THE INVENTION

1. Field of the Invention

The present invention relates to a head restraint assembly for motor vehicle seats for enabling a head restraint pad to be moved with respect to a motor vehicle seat.

2. Background Art

Motor vehicle seats typically include a head restraint pad mounted to the seat for comfort and safety of the passenger. The head restraint pad is mounted on one or two posts which are inserted into guide sleeves affixed to the seat. The posts typically include retainer notches which allow the head restraint pad to be vertically adjustable.

U.S. Pat. No. 4,854,642 to Hoover Universal, Inc., discloses a head restraint guide assembly having a bushing installed within the seatback for receiving the head restraint pad posts. The head restraint bushing includes extending legs with ramp surfaces so that when the bushing is inserted within the seatback, the legs are resiliently deflected and become locked into place when the installed position is reached. The head restraint post passes through the bushing and has a number of notches which provide detents. A detent lug carried by the bushing engages the detent notches and is resiliently biased against the post. The detent notches are provided with cam surfaces, enabling the head restraint to be raised and lowered to and past the detent positions. The lowermost notch forms a retainer notch with a radial wall which prevents complete removal of the head restraint. A leaf spring actuator can be depressed from outside of the seatback and acts on the detent lug to deflect it out of engagement with the detent notches, thereby enabling withdrawal of the head restraint assembly.

In order to remove the head restraint post, a downward force must be applied to the actuator by a tool such as a screwdriver, causing the lug to move out of engagement with the retainer notch.

U.S. Pat. No. 6,099,077 discloses a head restraint assembly for a motor vehicle. It is commonly owned with the present application and is incorporated herein by reference. That reference discloses actuator springs within a button subassembly that may become over-stressed because their deflection is relatively unconstrained over repeated use. The invention disclosed in U.S. Pat. No. 6,099,077 solves many of these problems.

SUMMARY OF THE INVENTION

One difficulty with such conventional approaches is associated with the risk of over-stressing a leaf spring present in a drawer or actuator portion of a head restraint assembly. Accordingly, it would be desirable to limit movement of the leaf of a spring so as to avoid over-stressing it, thereby ensuring that the spring always returns to its undeflected position.

Additionally, it would be desirable to provide a means to satisfy requirements mandated by a regulatory authority or by a customer including a feature which precludes inadvertent removal of the head restraint assembly from the seatback.

According to the present invention, an improved head restraint assembly is provided for enabling a head restraint pad to be lockably positioned with respect to a motor vehicle seatback. The head restraint pad includes at least one post connected to and supporting the head restraint pad. One or more of the posts associated with a restraint pad have at least one retainer notch for vertically adjusting the height of the head restraint pad. The same one post or another of the at least one posts has a square securement notch positioned below the lowermost of the retainer notches. The square securement notch serves to secure the post firmly in relation to the vehicle seatback so that it may not be readily removed therefrom unless a special tool is used.

A tubular bushing is mounted to the seat and has an inside bore sized for receiving the at least one post. The tubular bushing has a head outside the seat and the head has a socket with an open outside end.

A button subassembly is insertable into the open outside end of the socket. The button subassembly locks one of the posts in relation to the tubular bushing and seatback. This assembly has a drawer portion having a leading face and a central portion. The central portion has an aperture through which one of the posts extends. Deployed upon the leading face of the drawer portion is a spring or actuator. The actuator is movable between a forward actuated position in which the actuator is disengaged from any notch in the post and a rearward position to which the actuator is biased. In the forward position, deflection of a leaf of the actuator is limited either by a stop that is also provided by the actuator, or by a constraint imposed by a guide defined upon a rail (not shown). In the rearward position, the actuator engages a notch in the post after the button subassembly is released or snap/slot on guide.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
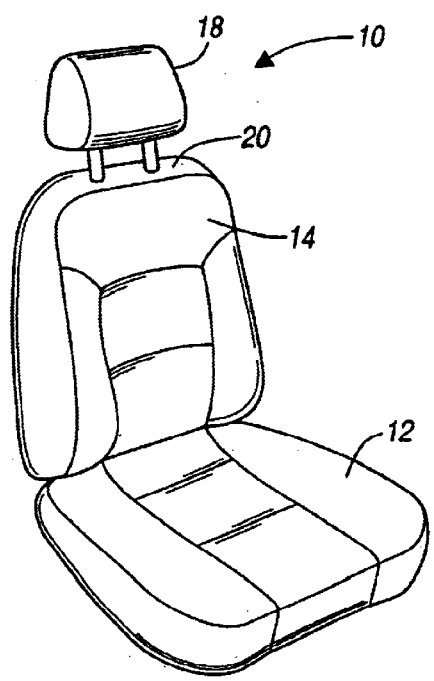
FIG. 1 is a perspective view of a motor vehicle seat of the type having a separate adjustable head restraint assembly.

Referring now to FIG. 1, there is shown a perspective view of a motor vehicle seat 10 having a bottom cushion 12 and a seatback 14. A head restraint assembly including a pad 18 is supported by the seatback 14. The assembly has a pad 18 and a pair of downwardly extending mounting posts 20.

Figure 2:
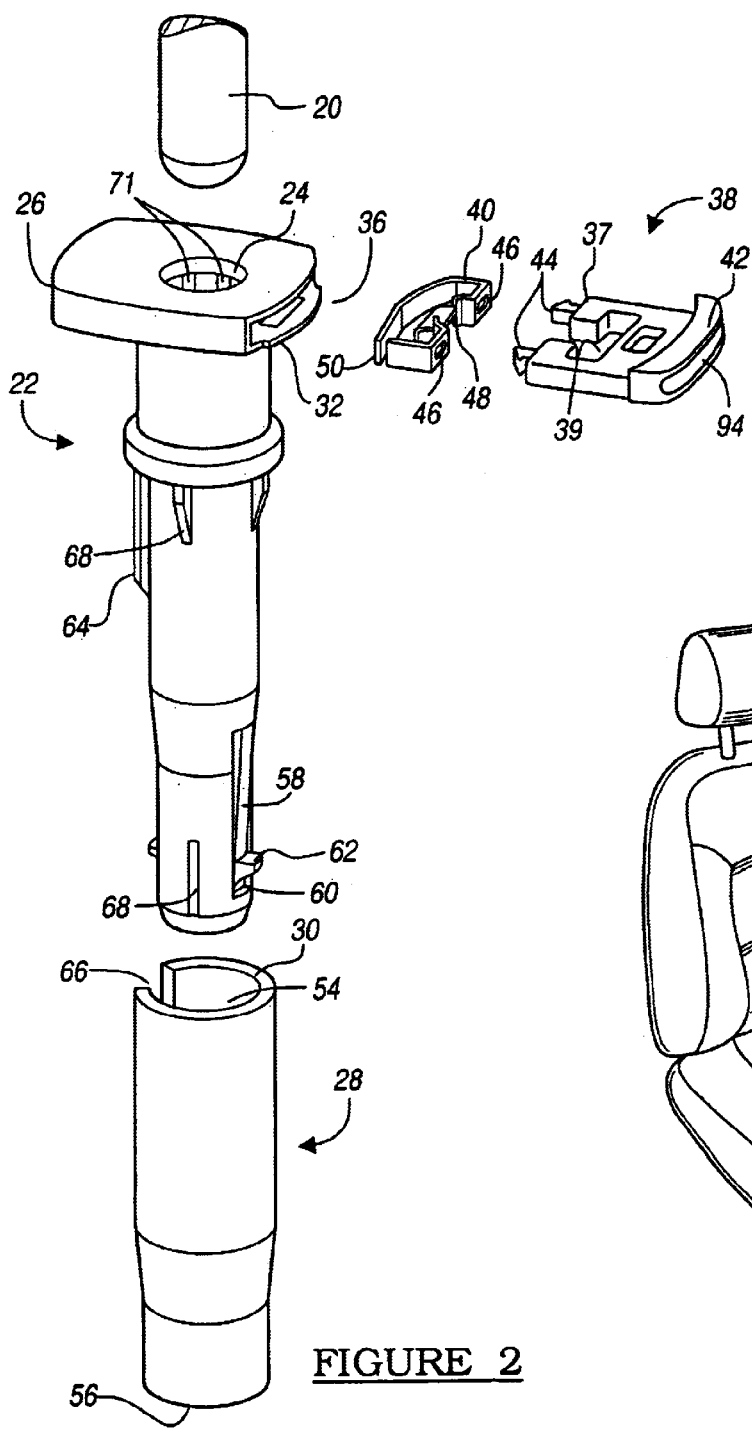
FIG. 2 is an exploded view of the button subassembly of the head restraint assembly according to the present invention.

FIGS. 2 through 7 illustrate various details of the head restraint assembly 16. The head restraint assembly enables the pad 18 to be moved inwardly and outwardly in relation to the motor vehicle seat 10. The seatback includes at least one tubular bushing 22, preferably made of plastic, as depicted in U.S. Pat. No. 6,099,077 which is incorporated herein by reference. Preferably, one tubular bushing 22 is provided for each post 20. Each tubular bushing 22 has an inside bore 24 for receiving the post 20. The bushing 22 further includes a head 26 formed at the upper end thereof which engages the outside of the seatback 14 when mounted to the seat 10. Preferably the seatback 14 includes a frame member 28 having an opening 30 larger than the tubular bushing 22 for receiving at least a portion of the tubular bushing 22 (FIG. 2).

Figure 3:
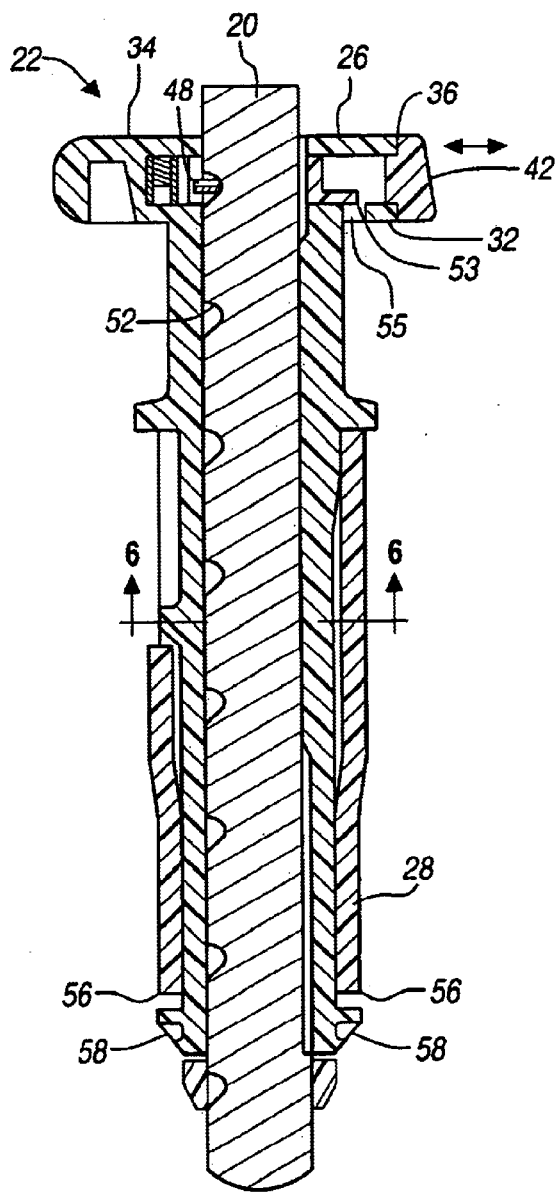
FIG. 3 is a longitudinal cross-sectional view of the head restraint assembly of FIG. 2, depicting engagement of the actuator with a notch in a post after the button subassembly is released.

Continuing with reference to FIGS. 2–3, the head 26 of the bushing 22 has a socket 32 exposed to the bore 24 at a first inner end 34, and outwardly accessible at a second end 36. A button subassembly 38 having an insertable end 37 is insertable into socket 32 through the accessible second end 36. The button subassembly 38 includes an actuator or spring 40 (FIGS. 2 and 5–7) located on one side of the bore 24 proximate the leading face or insertable end 37. A drawer portion 42 is located on the opposite end of the button subassembly from the insertable end. The button subassembly has a central portion 39 through which the post 20 extends.

In the preferred embodiment, the drawer portion 42 is provided with a leading face having at least one protrusion 44 (FIG. 2) insertable into at least one aperture 46 formed in the spring 40, thereby removably connecting the spring 40 and the drawer 42.

Additionally, the button subassembly 38 is configured to conform to the head 26 at the accessible second end 36 in the illustrated arrangement so that a flush engagement results when the actuator portion 42 is moved inwardly with respect to the head 26.

Figure 5:
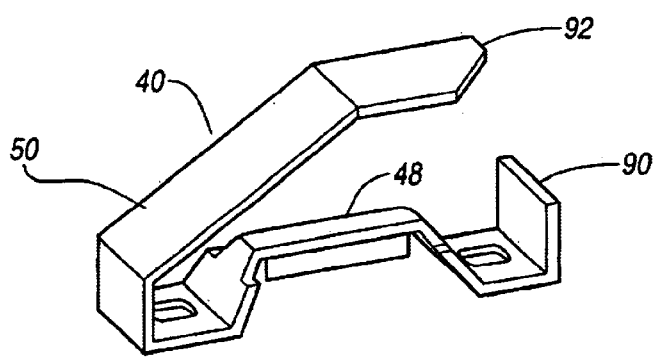
FIG. 5 is a perspective view of the spring or actuator.

Further, in the preferred arrangement, as best shown in FIG. 5, the spring 40 is provided with a crimped section that provides a tongue or saddle 48 and a leaf 50. Upon insertion of the button subassembly 38, the spring 40 is positioned within the bore 24. The leaf 50 contacts the first inner end 34 of the socket 32. The drawer 42 is positioned on the outer opposite end of bore 24 exposed at the accessible second end thereof.

Figure 4:
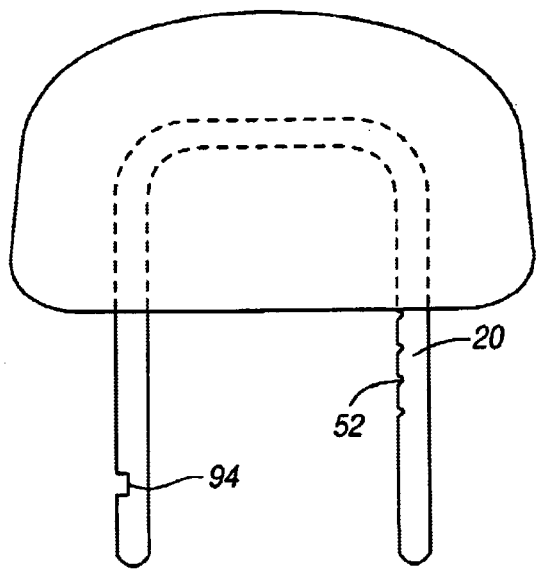
FIG. 4 depicts two of the posts connected to and supporting the head restraint pad—in this case, the right-hand post having four retainer notches, the left-hand post having a square securement notch.

The operation of button subassembly 38 may be understood upon continuing reference to FIGS. 2–7. At least one of the posts 20 is formed with at least one V- or U-shaped retainer notch 52 on its exterior surface (FIG. 4). When more than one retainer notch 52 is provided, they are preferably aligned on one side of post 20. The crimped section 48 is biased into alignment with the associated notch 52 provided along post 20.

The head restraint pad 18 may be moved up or down with respect to the seat 10 by moving drawer 42 into the socket 32 with the push of a finger. This action compresses the leaf 50 of the spring 40 and moves the crimp 48 out of alignment with the associated notch 52. The post 20 can then be moved inwardly and outwardly within the bore 24 until the desired height is reached. The actuator 42 is released and the crimp portion 48 is again in alignment with a different notch 52.

Turning now to FIG. 5, the actuator or spring 40 is depicted as being provided with a saddle 28 that is located adjacent to the leading face 37 of the drawer 42 of the button subassembly 38. A leaf spring member 50 extends from the saddle section within the socket 32 away from the open outside end of the socket 32. A stop portion 90 extends from the other end of the saddle portion 48 in a direction away from the leading face 37 of the drawer 42. In use, a distal end 92 of the leaf 50 contacts the stop portion 90 when the drawer 42 is pushed inwardly into the socket 32. Thus, during many cycles of spring actuation, the risk of overstressing the leaf 50 is minimized.

Figure 7:
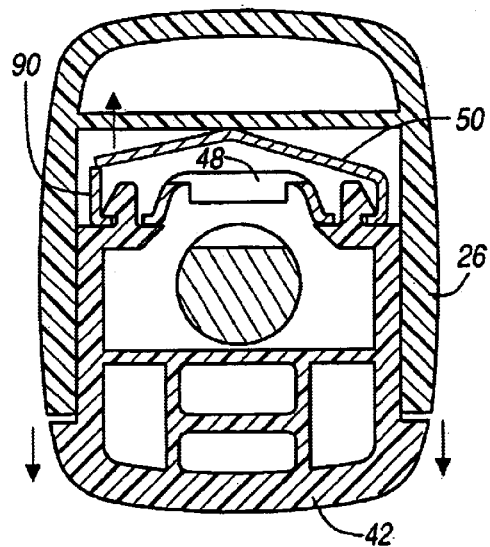
FIG. 7 resembles FIG. 6, except that the drawer portion is in its forwardmost position and the actuator is moved so as to be disengaged from a notch in the post.

FIG. 7 depicts a rearward position of the actuator to which the actuator is biased, in which the saddle 48 engages a notch in the post after the button subassembly is released. FIG. 7 depicts the drawer in a forward position in which the saddle 48 is disengaged from any notch in the post.

It will readily be appreciated that the V-shaped notches 52 depicted in FIG. 4 may be deployed additionally or alternatively on the left-hand post. Correspondingly, the quadrilateral or square notch 94 can be provided additionally or alternatively on the right-hand post.

Figure 6:
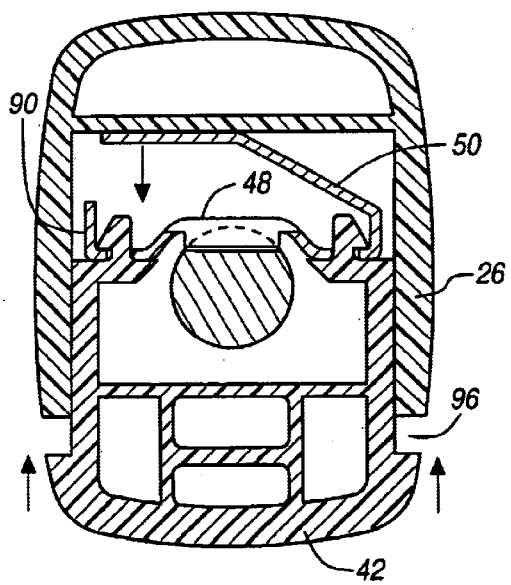
FIG. 6 is a plan view of the button subassembly before the drawer portion is slid inwardly into the socket, the actuator lying in its natural, biased position.

It should also be appreciated that the actuator or spring 40 (FIG. 5) could be oriented so that the leaf 50 could extend from either the right- or the left-side of the drawer 42 (FIGS. 6–7). Correspondingly, the stop 90 could easily be located on the left or on the right side of the drawer.

Thus, the actuator or spring 40 has two effective positions. In a first position, its purpose is to resist inward movement of the drawer 42 while removing the saddle 48 from a notch in the post. In a second position, the leaf 50 abuts the post 90, which constrains the amount of deflection of the leaf 50 and thereby minimizes any tendency to become overstressed when exposed to repeated cycles during operational use.

As depicted in FIG. 6, there is a gap 96 between the drawer 42 and the head 26. Preferably, this gap 96 is enough to allow the crimped section to release from the post so that inward movement of the drawer 42 is limited.

Returning to FIG. 4, the square or quadrilateral securement notch 94 is positioned below the lowermost adjustment V-shaped notch 52. Thus, when the headrest is displaced outwardly, so that the saddle 48 rides below the lowermost V-shaped notch 52, the saddle 48 becomes firmly entrenched in the quadrilateral securement notch 94. Once the saddle 48 is positioned within the quadrilateral securement notch 94, a special tool is required for disengagement. In use, the special tool may deflect the outer surface of saddle 48 inwardly within the socket 32 from a flush-mount position before inward displacement.

It will readily be appreciated that the form of the head 26 can assume different aspects: round, oval, rectangular, square or combinations thereof.

If desired, a configuration such as depicted in FIG. 6 could be deployed on one side of the seatback 14 to engage one of a pair of posts extending from the head restraint pad 18. If the other of the pair of posts is provided with a quadrilateral securement notch 94, a form of button subassembly could be provided wherein the drawer 42 is flush-mounted in relation to the head 26. When the saddle 48 engages the securement notch 94, the drawer 42 will move outwardly to a flush position. Deliberate removal of that post from the seatback 14 will then only be accomplished by deploying a suitable tool.

Preferably, the spring 40 is made out of a spring steel. However, one skilled in the art could manufacture the spring out of other materials, such as other metals or polymers in the form of wire or bar stock.

Thus, it is apparent that there has been provided, in accordance with the invention, an improved head restraint assembly for motor vehicle seats that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the following claims.

What is claimed is:

1. An adjustable head restraint assembly for use with a head restraint pad that is lockably positioned with respect to a motor vehicle seatback, the assembly comprising:
   - at least one post connected to and supporting the head restraint pad to permit the pad to be locked in one of several height positions in relation to the seatback, the at least one post having at least one notch;
   - a tubular bushing mounted at least partially within the seatback and having an inside bore sized for receiving one of the at least one posts, the tubular bushing having a head, the head having a socket with an open outside end; and
   - a button subassembly insertable into the open outside end for locking one of the at least one posts in relation to the tubular bushing, the button subassembly having
     - a drawer having a leading face and a central portion, the central portion having an aperture through which one of the at least one posts extends; and
     - an actuator deployed upon the leading face, the actuator being movable between a forward actuated position in which the actuator is disengaged from any notch in the post and a rearward position to which the actuator is biased, in which the actuator engages a notch in the post after the button subassembly is released;
   - the actuator including:
     - a saddle located adjacent to the leading face;
     - a leaf spring member extending from one end of the saddle; and
     - a stop extending from the other end of the saddle in a direction away from the leading face of the drawer.

2. The head restraint assembly of claim 1 wherein at least some of the notches in a given post are generally V-shaped for ready engagement by the actuator when located in a rearward position.

3. The head restraint assembly of claim 1 wherein at least one of the notches is generally configured as a quadrilateral and is located below the lowermost of the V-shaped notches, the quadrilateral-shaped notch serving as a securement notch to prevent inadvertent separation of a post from the vehicle seatback.

4. The head restraint assembly of claim 3 wherein the at least one securement notch extends inwardly from an exterior surface of the at least one post.

5. The head restraint assembly of claim 4 wherein the at least one V-shaped notch and the at least one securement notch are provided on different posts.

6. The head restraint assembly of claim 4 wherein the at least one V-shaped notch and the securement notch are provided upon the same post.

7. A method of attaching a head restraint assembly having a head restraint pad to a seatback, the method comprising:
   - attaching at least one post to the head restraint pad for supporting the head restraint pad and to permit the pad to be moved inwardly and outwardly in relation to the seatback, the at least one post having at least one notch on the exterior surface of the at least one post;
   - providing a tubular bushing at least partially within the seatback, the bushing having an inside bore sized for receiving one of the at least one posts;
   - inserting a button subassembly into a socket disposed within the tubular bushing, the button subassembly serving to lock one of the at least one posts in relation to the tubular bushing of the seatback, the button subassembly having a drawer and an actuator deployed upon a leading face thereof, the actuator being movable between a forward actuated position in which the actuator is disengaged from any notch in the post and a rearward portion to which the actuator portion is biased, in which the actuator engages a notch in the post after the button subassembly is released; and
   - constraining movement of a leaf member of the actuator by providing a stop associated with the actuator which limits the range of movement of the leaf member.

* * * * *